Feb. 18, 1969 A. S. GOODWIN 3,428,781
LIQUID HEATING AND CIRCULATING UNIT
Filed Feb. 7, 1966
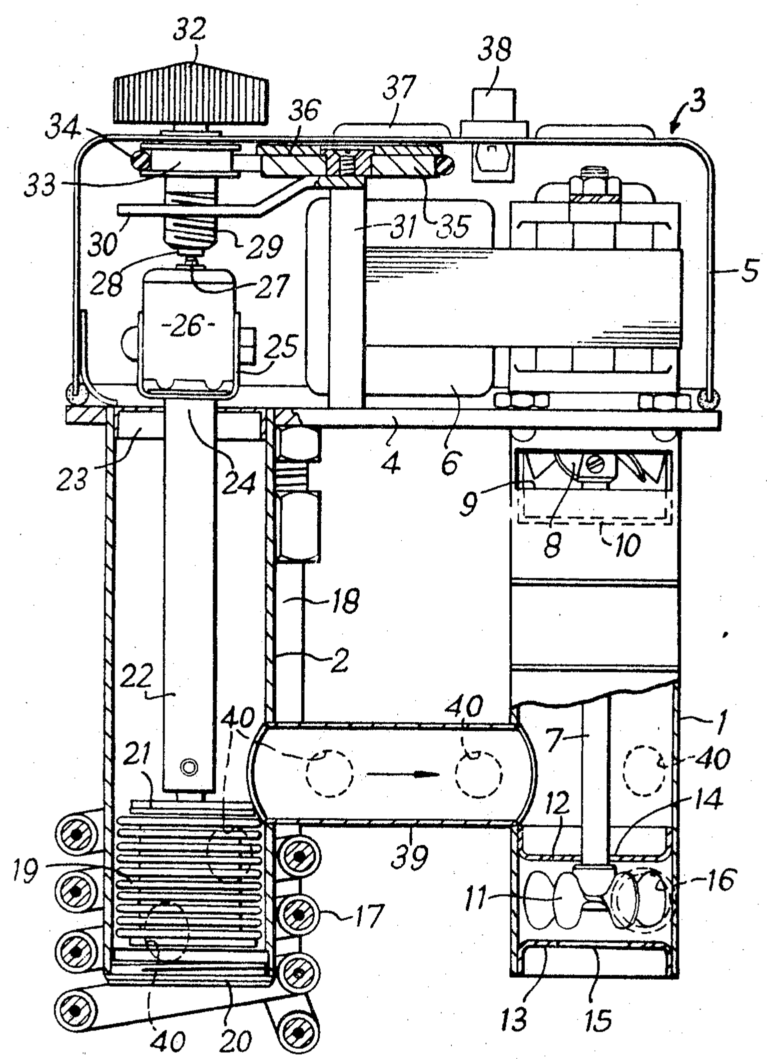
INVENTOR
Alfred Stanley Goodwin
BY
Karl W. Flocks
ATTORNEY

United States Patent Office 3,428,781

Patented Feb. 18, 1969

3,428,781

LIQUID HEATING AND CIRCULATING UNIT

Alfred S. Goodwin, London, England, assignor to Baird and Tatlock (London) Limited, Heath, England, a company of Great Britain Filed Feb. 7, 1966, Ser. No. 525,456
Claims priority, application Great Britain, Feb. 8, 1965, 5,352/65
U.S. Cl. 219—331 3 Claims
Int. Cl. F24h *1/08*

ABSTRACT OF THE DISCLOSURE

A portable liquid heating and circulating unit for maintaining a laboratory liquid bath at a constant temperature has a pair of interconnected housings adapted to be partially immersed in the bath. The first housing is provided with a thermostatically controlled electric heater and the second housing has associated therewith means for circulating the liquid heated in the first housing. The second housing and the interconnection between the housings are provided with means remote from the region of the heater for diluting the heated liquid from the first housing prior to discharge into the bath, thereby avoiding concentration of heat caused by high output short period operation of the heater.

This invention relates to a liquid heating and circulating unit and is particularly, although not exclusively, concerned with a portable unit for laboratory use.

When it is desired to maintain a liquid bath, for example, a water bath, at a constant temperature, it is usual to provide a thermostatically controlled heater and means for circulating the liquid. However, previously used arrangements have tended to produce localised heating in the bath and moreover the range of variation from the desired temperature has sometimes been excessive.

It is accordingly an object of the present invention to provide an improved liquid heating and circulating unit of compact form which is particularly although not exclusively, for laboratory use.

According to the present invention there is provided a liquid heating and circulating unit comprising a pump impeller disposed in the lower part of a first tubular housing submersible in the liquid, at least one liquid outlet in the housing near the impeller, a heater laterally displaced from the housing, a tubular connection between the housing and the region of the heater to constitute a heated liquid inlet to the housing and at least one additional liquid inlet to the housing, or said tubular connection. Preferably the heater surrounds the lower part of a second tubular housing extending parallel with the first housing and coupled thereto by said interconnection. The upper ends of the housings may be bridged by a head incorporating a motor for the impeller and thermostatically controlled switch means for the heater. A temperature response device may be located in the lower part of the second housing and mechanically coupled with the switch means.

A number of said additional liquid inlets are preferably provided in the tubular interconnection, in the wall of the first tubular housing and at the end of the first tubular housing.

One embodiment of the invention will now be described by way of example, with reference to the single figure of the accompanying drawing, which shows, in vertical section, a liquid heating and circulating unit for laboratory use.

Referring to the drawing, the unit comprises first and second tubular housings 1 and 2 depending in spaced parallel relationship from a head 3 which comprises a mounting plate 4 and a cover 5. An electric motor 6 is secured to the plate 4 and drives a shaft 7 extending axially through the housing 1. Near the upper end of the housing 1 the shaft carries a fan 8 opposite a pair of slots, such as 9, in the housing, the latter being closed by a cup-shaped member 10 below the fan. The upper part of the housing 1 communicates with the interior of the head 3, so that cooling air may be drawn by the fan 8 through the slots 9 and into the head. At its lower end the shaft 7 carrier a liquid impeller 11 disposed between a pair of plates 12 and 13, perforated at 14 and 15, and the housing is formed with a liquid outlet aperture 16 between the plates.

A heating coil 17 surrounds the lower part of the housing 2 in spaced relationship thereto, its ends extending alongside the housing, as at 18, to pass through the plate 4 at watertight junctions. The coil may, as shown in the drawing, be of metal sheathed mineral insulated cable. A bellows 19 is disposed with clearance within the lower part of the housing 2 and with its lower end 20 secured to the housing and its upper end 21 coupled with a rod 22 extending upwardly through the housing and into the head 3. The upper end of the housing 2 is closed by an annular plug 23 surrounding the rod. Within the head 3 the upper end 24 of the rod is secured to a cradle 25, carrying a micro-switch 26, the operating button 27 of which faces upwardly.

The button 27 is engaged by a plunger 28, resiliently carried by an externally threaded bush 29, screwed into a threaded aperture in a support plate 30. The latter is carried between a pair of pillars such as 31, supported on the plate 4, one on each side of the motor 6. The outer end of the bush 29 extends through an aperture in the cover 5 and is provided with a control knob 32. Beneath the cover 5 the bush carries a pulley 33, joined by a belt 34, with a disc 35 rotatable on the plate 30. The upper surface of the disc is faced with a calibrated plate 36, part of which is visible externally of the cover through a window 37. A neon indicator 38 is carried by the cover 5 to show when the heater 17 is energised.

The housings 1 and 2 are joined by a tubular connection 39 disposed above the level of both the bellows 19 and the impeller 11. Some additional liquid inlet apertures indicated by dotted lines 40 are also provided. These apertures may be in the housings 1 and 2 and the interconnection 39 or in only some of these elements. In addition it will be understood that the dotted lines 40 are not intended to represent the exact positions of the apertures, which may depend upon the dimensions of the housings, the speed of the impeller 11 and the characteristics of the bellows 19 and heater 17.

It will be understood that the micro-switch 26 controls energization of the heating coil 17 and that the plate 36 is calibrated in temperature. In addition the bellows 19 contains a fluid having an expansion characteristic appropriate to the range of temperatures desired to be controlled and it will be understood that expansion of the bellows causes upward movement of the micro-switch 26 and operation thereof, dependent upon the setting of the knob 32.

When the motor 6 is energized, liquid is drawn from the region of the heater into the lower end of the housing 2 and through any apertures 40 therein, to pass around the bellows 19, through the connection 39 to the housing 1 and outwardly thereof through the aperture 16.

This liquid is diluted during its passage through the unit by further liquid entering the connection 39 and housing 1 through any apertures 40 therein and by liquid drawn through the perforation 15. This diluting liquid is drawn from the bath at positions away from the region of the heating coil 17.

The unit of the present invention ensures, as a result of the diluting action referred to above, a rapid method of altering or maintaining the general bath temperature, whilst avoiding the concentration of heated liquid, which is often caused by high output short period heating cycles. It also enables the output from the impeller to be used for circulation of liquid externally of the bath, with the minimum of temperature fluctuation.

As described the housing 1 is of comparatively short length, so that no lower bearing for the shaft 7 is required. If a larger housing is used, it may be desirable to provide a lower end bearing for the shaft 7.

I claim:

1. A liquid heating and circulating unit comprising first and second tubular housings submersible in a liquid, a pump impeller means having its impeller disposed in the lower part of said first tubular housing, at least one liquid outlet in said first tubular housing near said impeller, a heating means mounted relative to said second tubular housing and surrounding the lower part of said second tubular housing, a tubular connection between said first tubular housing and said second tubular housing in the region of said heating means to constitute a heated liquid inlet to said first tubular housing, and at least one additional liquid inlet in the assembly comprising said first tubular housing and said connection.

2. A unit according to claim 1 comprising a head bridging the upper ends of said housings, said impeller means including a motor and said heating means including a thermostatically controlled switch means, both said motor and said switch means being mounted on said head.

3. A liquid heating and circulating unit comprising first and second tubular housings submersible in a liquid, a pump impeller disposed in the lower part of said first tubular housing, at least one liquid outlet in said first tubular housing near said impeller, a heating means surrounding the lower part of said second tubular housing, a tubular connection between said first tubular housing and said second tubular housing in the region of said heating means to constitute a heated liquid inlet to said first tubular housing, a head bridging the upper ends of said housings, a motor for said impeller and thermostatically controlled switch means for said heating means being mounted on said head, a temperature responsive device located in the lower part of said second tubular housing and mechanically coupled with said switch means and additional liquid inlets in said tubular connection, the wall of said first tubular housing, and at the end of said first tubular housing.

References Cited

UNITED STATES PATENTS 2,795,686 6/1957 De Bruyne ---------- 219—331
2,993,108 7/1961 Haake ----------- 219—323 X ANTHONY BARTIS, *Primary Examiner.*

U.S. Cl. X.R.

219—523, 380; 165—107